L. WILLIS.
PLANT SPRAYING MACHINE.
APPLICATION FILED MAY 24, 1910.
999,076.
Patented July 25, 1911.
2 SHEETS—SHEET 1.
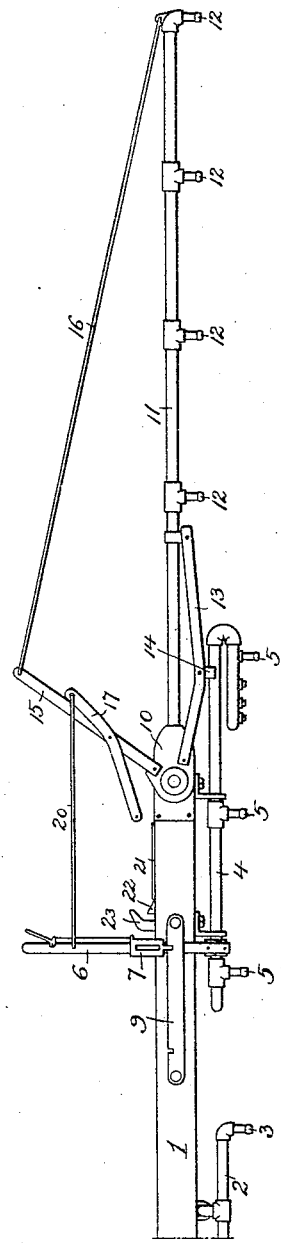
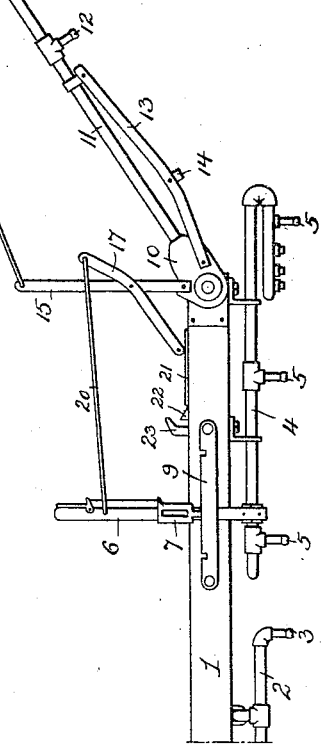
Witnesses
Harry L. Smith
Kate A. Beadle
Inventor
Leland Willis
by his Attorneys
Smith

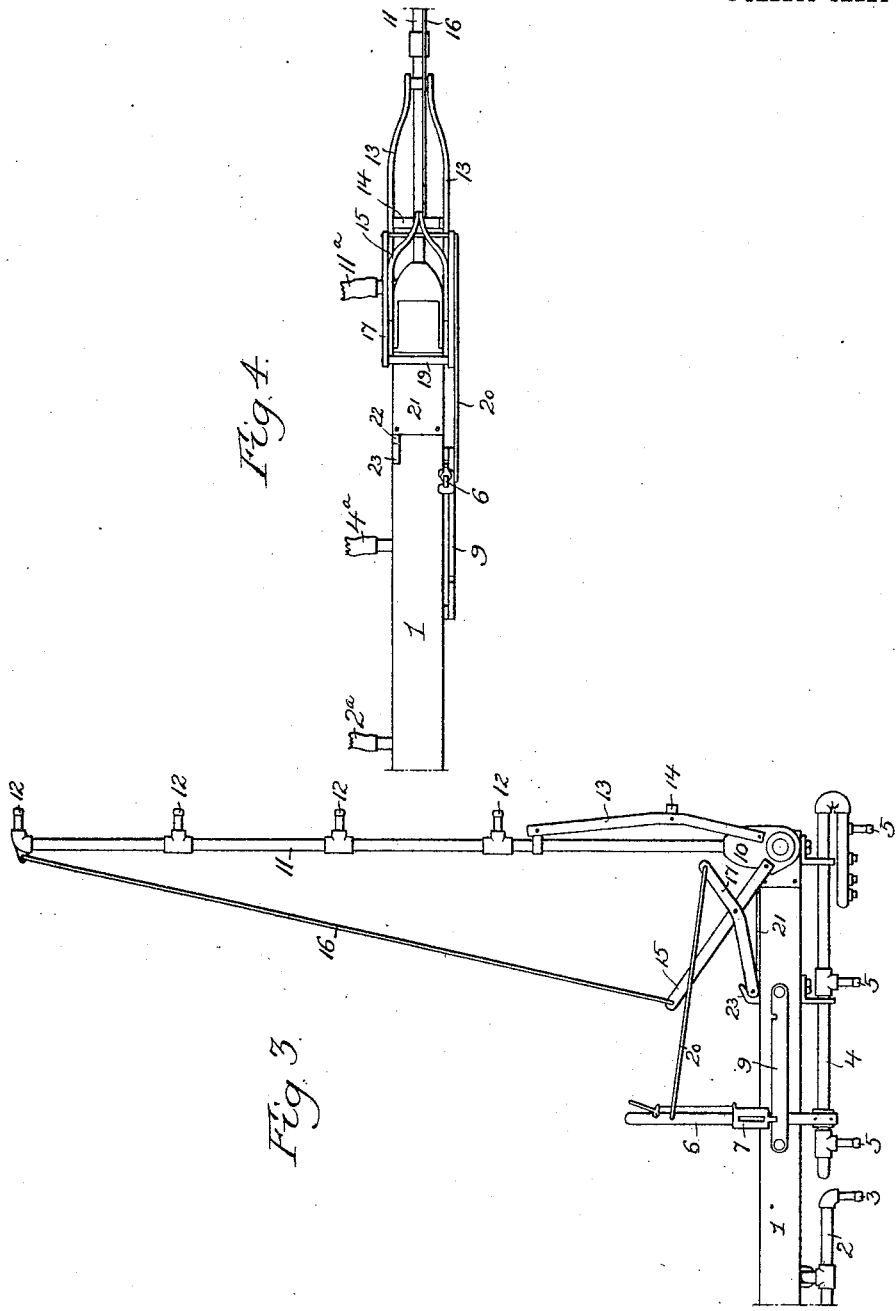

UNITED STATES PATENT OFFICE.

LELAND WILLIS, OF GRENLOCH, NEW JERSEY, ASSIGNOR TO BATEMAN MANUFACTURING COMPANY, OF GRENLOCH, NEW JERSEY, A CORPORATION OF NEW JERSEY.

PLANT-SPRAYING MACHINE.

999,076. Specification of Letters Patent. Patented July 25, 1911.

Application filed May 24, 1910. Serial No. 563,215.

*To all whom it may concern:*

Be it known that I, LELAND WILLIS, a citizen of the United States, residing in Grenloch, New Jersey, have invented certain Improvements in Plant-Spraying Machines, of which the following is a specification.

My invention relates to that class of spraying machines which are provided with spray pipes pivoted at each side of the main frame so that they can be raised to an upright position in turning the machine at the ends of rows or in passing through gates or doorways.

My invention relates especially to machines having a wide spread and in which, consequently, the pivoted spray pipes are relatively long.

The object of my invention is to provide means whereby the spray pipes are efficiently supported when lowered or extended, and means whereby they can be conveniently raised and lowered without requiring excessive movement of those members of the operating mechanism which are manipulated by the attendant and without requiring the exertion of an excessive amount of force in order to effect the raising or govern the lowering of the spray pipes. This object I attain in the manner hereinafter set forth, reference being had to the accompanying drawings, in which—

Figure 1 is a rear view of sufficient of a spraying machine to illustrate my present invention, the pivoted spray pipe being shown in the lowered or extended position; Fig. 2 is a similar view showing the pivoted spray pipe in a partly raised position; Fig. 3 is a similar view showing the pivoted spray pipe in the fully raised position, and Fig. 4 is a plan view of part of the machine with the parts in the position shown in Fig. 1.

In the drawings, I have shown the mechanism at one side of the machine only, it being understood that the mechanism at the opposite side of the machine is the same as that illustrated.

1 represents a cross bar of the machine which is intended to form part of, or being mounted upon, the wheeled frame which carries the spray pump, tank, and other appurtenances of the machine, this bar having mounted upon it a central fixed pipe 2, with nozzle 3 at each end and also having depending bearings for the reception and lateral guidance of a sliding spray pipe 4, which has nozzles 5 equidistantly disposed thereon, said sliding pipe 4 being provided with a vertical handle 6 having a locking bolt 7 which engages with a notched bar 9 on the face of the bar 1, so that said handle can be retained in either of its extreme positions of adjustment, as shown, respectively, in Figs. 1 and 3.

Pivotally mounted at the outer end of the bar 1 is a hollow head 10, from which projects the spray pipe 11, the latter being provided with equidistantly disposed nozzles 12, of which there may be as many as the desired capacity of the machine may demand, the sprayer shown in the drawing being a 16-row sprayer, the fixed central pipe 2 having a nozzle at each end, each sliding pipe 4 having three nozzles, and the extension spray pipe 11 having four nozzles.

To aid in the support of the projecting spray pipe when the latter is in the lowered position shown in Fig. 1, said spray pipe has, below the inner portion of the same, a truss 13 provided with a shoe 14 which, when the spray pipe is lowered, rests upon and is supported by the outer portion of the sliding spray pipe 4, when the latter is extended, as shown in Fig. 1.

The head 10 of the spray pipe 11 has a projecting arm 15, preferably forked as shown in Fig. 4, the outer end of this arm being connected to the outer end of the spray pipe by means of a rod 16, whereby movement imparted to the arm 15 will be transmitted not only to the head 10 but also to the outer end of the spray pipe. Pivotally mounted upon the arm 15 is a lever 17, shown in the present instance as in yoke form, the lower end of this lever carrying a roller 19 (Fig. 4) and its upper end being connected by a rod 20 to the handle 6.

On the top of the bar 1 is a plate 21 and at the inner end of the latter is a beveled lug 22 and a post 23, the latter having a forwardly inclined upper end.

The pumping apparatus is connected to each of the spray pipes 2, 4 and 11 by means of a flexible hose, that for the pipe 2 being shown at 2ª, that for the pipe 4 at 4ª, and that for the pipe 11 at 11ª, in Fig. 4 of the drawing.

When the machine is in operation the parts occupy the relation to each other shown in Fig. 1, the sliding spray pipe 4 being projected, the extension spray pipe 11 being lowered, and the operating handle 3 being at the limit of its outward movement and being locked in that position, as shown in Fig. 1. When it is desired to raise the spray pipe 11 the handle 6 is first unlocked and then moved inwardly, the first effect of this operation being to lift the spray pipe by reason of the contact of the outer end of the lever 17 with the arm 15, the lever being now fulcrumed upon the arm and the point of contact of the outer end of the lever with the arm being relatively remote from the pivotal axis of the spray pipe, as shown in Fig. 1, so as to gain leverage and start the lifting movement with the exertion of the minimum amount of power. When the lifting movement has been fairly started, the roller 19 at the lower end of the lever 17 comes into contact with the plate 21 and rolls inwardly along the same, and this roller 19 now becomes the fulcrum of the lever, as shown in Fig. 2, while power is applied to the arm at the point where the lever is pivoted thereupon, this point being relatively close to the pivot of the spray pipe, so as to increase the speed of the lifting movement and permit the full lift of the pipe to be effected with a relatively short movement of the handle 6. When the handle 6 reaches the inward limit of its movement the raising of the spray pipe 11 has been fully accomplished, the handle is locked to the bar 9, as shown in Fig. 3, and the roller 19 of the lever 17 has traveled over the beveled lug 22 and dropped behind the same so as to serve as an additional means for locking the spray pipe 11 in its elevated position. In starting to lower the spray pipe 11 the first outward movement of the handle 6 serves to turn the lever 17 on its pivot and lift the roller 19 from behind the lug 22, thereby unlocking the lever. The forwardly bent upper end of the post 23 then strikes the roller and causes the same to move forward so as to start the forward movement of the arm 15 and the downward swing of the spray pipe. The same leverage, due to the use of the yoke 17, which permitted the attendant to lift the spray pipe 11 with relatively slight effort also enables him to control, without undue effort, the lowering of said spray pipe, which, owing to its length, is comparatively heavy, and, unless its descent was under control, might acquire such momentum as to cause injury to those parts whereby its descent is finally arrested.

It will be apparent that a pin may replace the roller 19 without materially affecting the operation of the machine, the roller being used simply to reduce friction.

I claim:

1. The combination of a main frame, a laterally sliding spray pipe, an outer pivoted and swinging spray pipe, and a single handle connected to both of said pipes whereby, as the sliding spray pipe is extended the outer spray pipe will be lowered and as the sliding spray pipe is retracted, the outer spray pipe will be raised.

2. The combination of a main frame, a side spray pipe, an outer pivoted and swinging spray pipe, and a rigid truss carried by the latter and bearing upon the top of the side spray pipe when said outer spray pipe is lowered.

3. The combination of a main frame, an outer pivoted and swinging spray pipe, an arm thereon, and a lever pivoted on said arm and having a bearing upon the arm beyond the pivot when the spray pipe is lowered, said lever having a fulcrum which is brought into contact with the main frame of the machine as the spray pipe is raised and slides upon said main frame as the raising movement continues, whereby power to raise the spray pipe is first imparted to the arm at a point beyond the pivot of the lever and is afterward transmitted to said arm through the pivot of the lever.

4. The combination of a main frame, an outer pivoted and swinging spray pipe, an arm projecting therefrom, a lever pivoted to said arm, and having a fulcrum free to slide on the main frame, and a locking lug for said fulcrum.

5. The combination of a main frame, an outer pivoted and swinging spray pipe, an arm projecting therefrom, a lever pivoted to said arm, and having a fulcrum free to slide on the main frame, a locking lug for said fulcrum, and a post adjacent to said locking lug and serving as a stop for the fulcrum.

6. The combination of a main frame, an outer pivoted and swinging spray pipe, an arm projecting therefrom, a lever pivoted to said arm, and having a fulcrum free to slide on the main frame, a locking lug for said fulcrum, and a post adjacent to said locking lug and serving as a stop for the fulcrum, the upper end of said post being inclined forwardly.

7. The combination of a main frame, an outer pivoted and swinging spray pipe, an arm projecting therefrom, and a lever pivoted to said arm, and having a bearing thereon beyond the pivot, and a fulcrum free to slide on the main frame.

8. The combination of a main frame, an outer pivoted and swinging spray pipe, an arm projecting therefrom, a lever pivoted to said arm and having a fulcrum free to slide on the main frame, an operating handle connected to said lever, and independent locking means for said handle and the lever.

In testimony whereof, I have signed my name to this specification in the presence of two subscribing witnesses.

LELAND WILLIS.

Witnesses:
LEON A. RITTENHOUSE,
HARRY SNYDER.

Copies of this patent may be obtained for five cents each, by addressing the "Commissioner of Patents, Washington, D. C."